United States Patent [19]

Beezley

[11] 4,181,931
[45] Jan. 1, 1980

[54] TWO-PHASE CONTROL SYSTEM
[75] Inventor: Dale L. Beezley, Sunnyvale, Calif.
[73] Assignee: The United States of America as represented by the Secretary of the Navy, Washington, D.C.
[21] Appl. No.: 861,148
[22] Filed: Dec. 16, 1977
[51] Int. Cl.² .............................................. H03K 17/56
[52] U.S. Cl. ........................................ 363/4; 307/244; 363/60
[58] Field of Search .................. 363/4, 15, 36, 34, 89, 363/97, 52, 61, 67, 84, 126; 307/244, 254, 259

[56] References Cited
U.S. PATENT DOCUMENTS

| | | | |
|---|---|---|---|
| 2,530,784 | 11/1950 | Pohm | 363/4 |
| 3,088,066 | 4/1963 | Seeley | 363/4 |
| 3,171,078 | 2/1965 | Keener | 363/48 |
| 3,258,763 | 6/1966 | Logan | 340/332 |
| 3,337,749 | 8/1967 | Lee et al. | 307/242 |
| 3,368,164 | 2/1968 | Shapiro | 363/34 X |
| 3,569,741 | 5/1971 | Bolick, Jr. | 307/244 |
| 3,586,958 | 6/1971 | Kafka | 363/35 X |
| 3,699,358 | 10/1972 | Wilkinson | 307/242 |

Primary Examiner—J. D. Miller
Assistant Examiner—Peter S. Wong
Attorney, Agent, or Firm—R. S. Sciascia; Charles D. B. Curry; Francis I. Gray

[57] ABSTRACT

A two-phase control system for sequential switching of a.c. power. An a.c. input is split into two phases. The two phases are switched simultaneously or independently by a plurality of switches in sequence. The output from the switches is recombined to provide the original a.c. signal at a desired voltage level.

16 Claims, 6 Drawing Figures

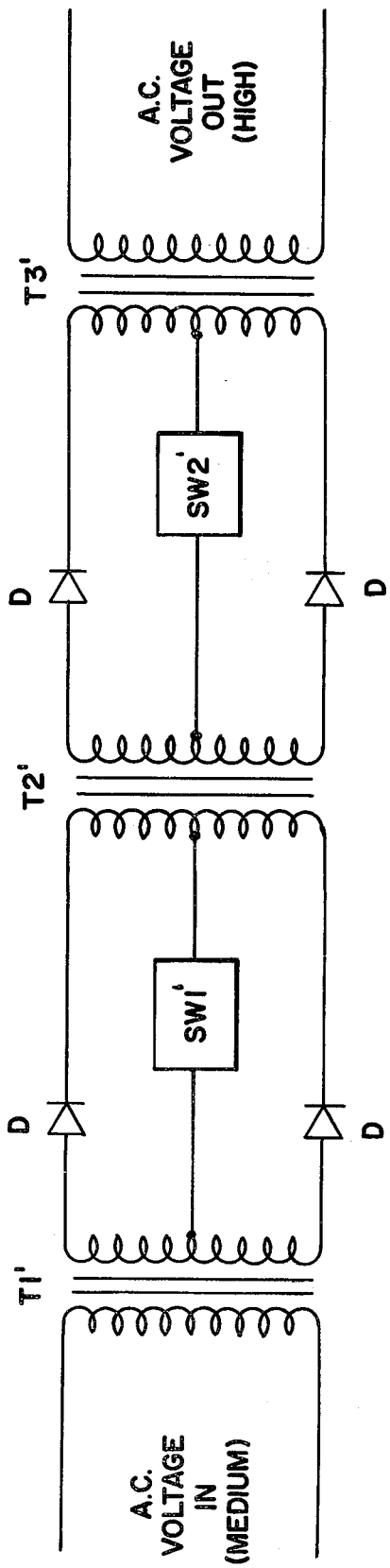
FIG_1 (PRIOR ART)
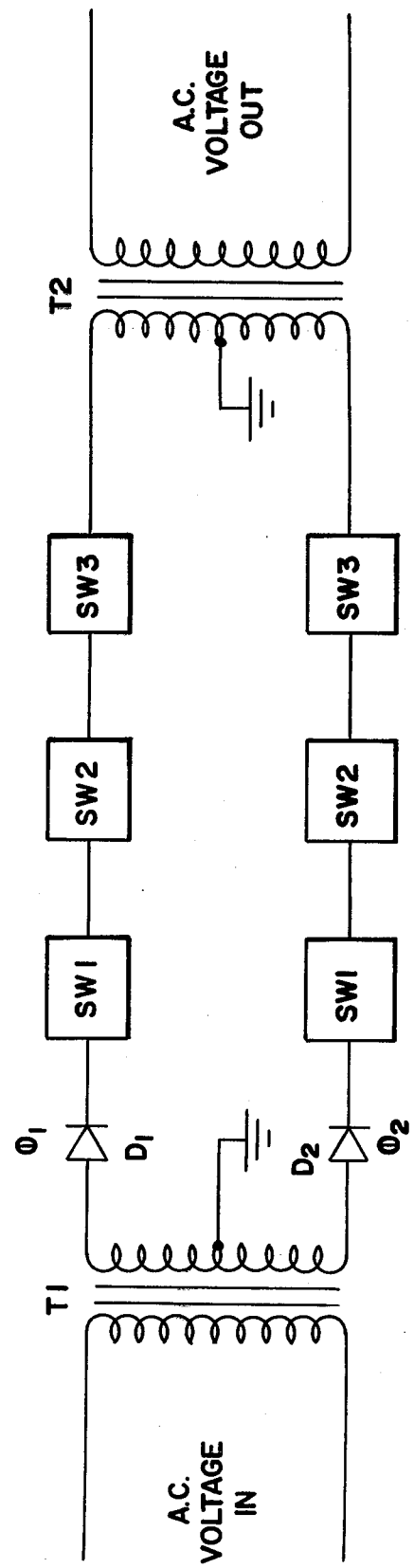
FIG_2

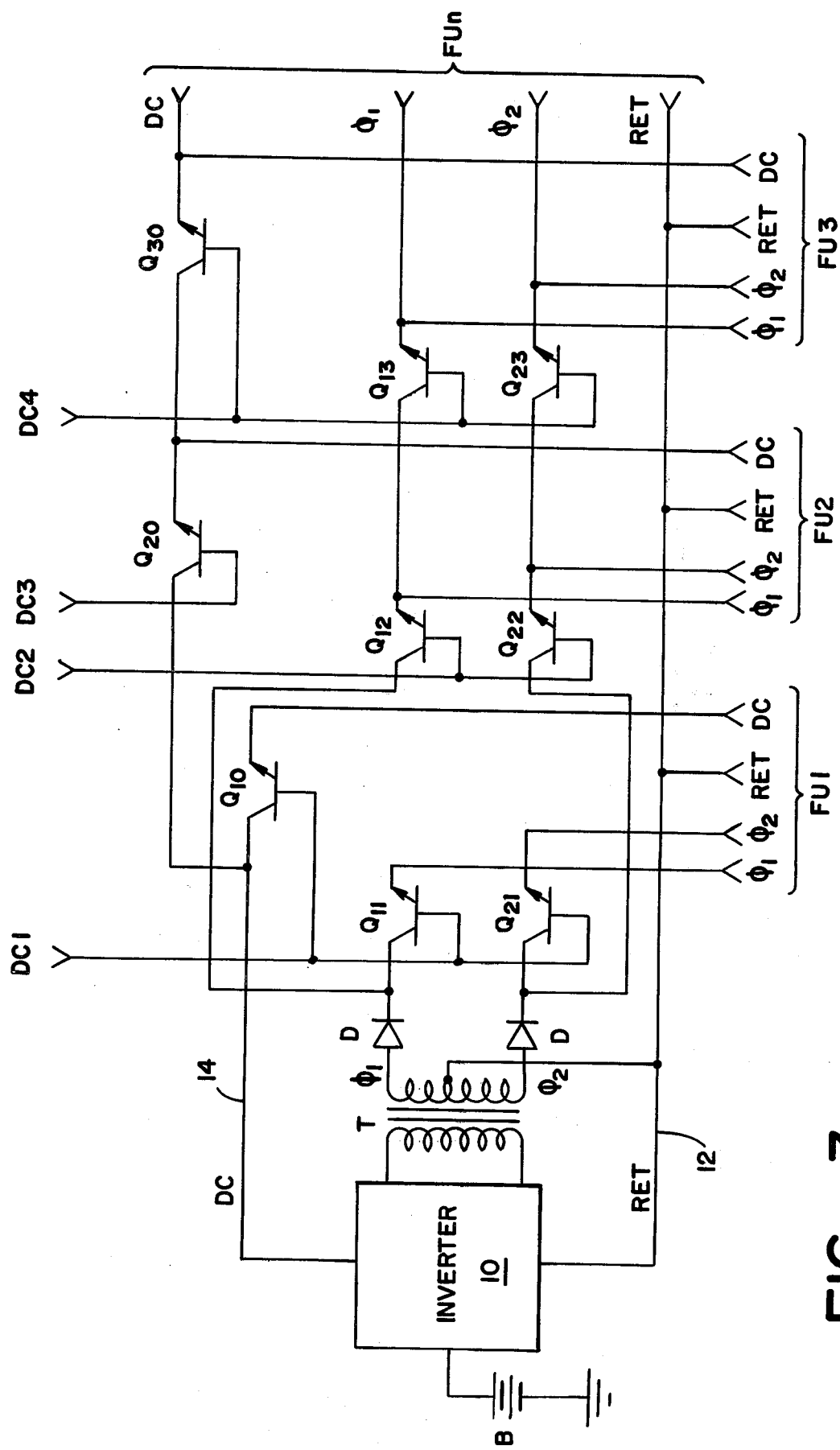
FIG_3

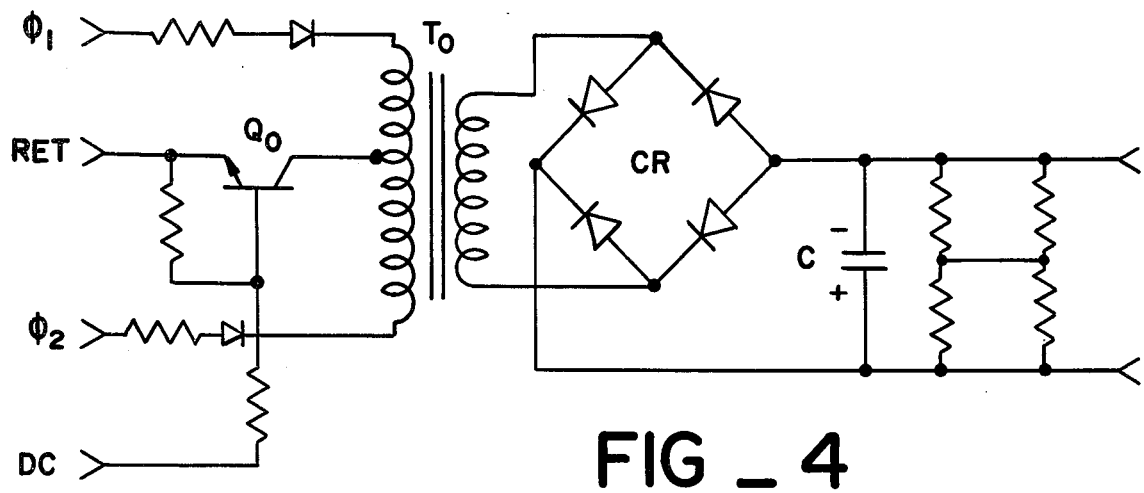
FIG_4
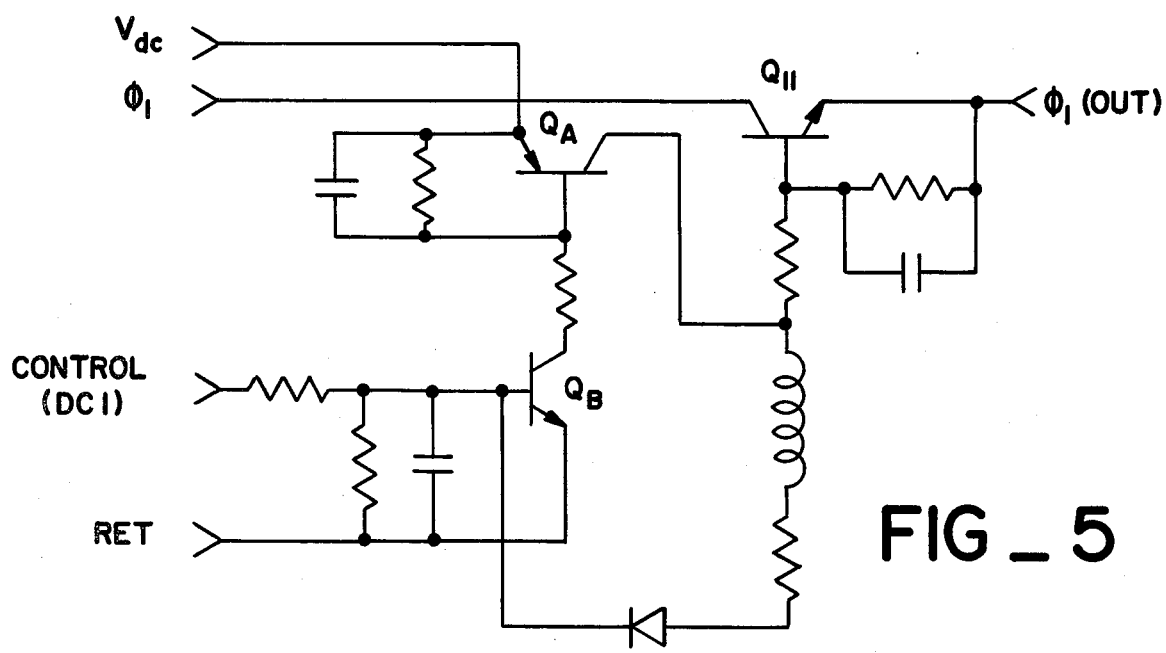
FIG_5
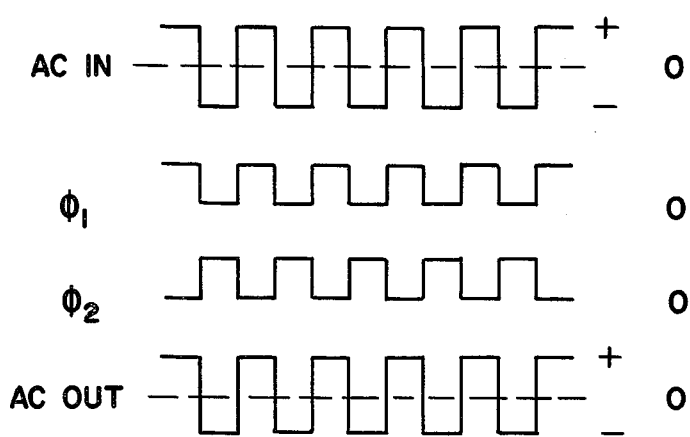
FIG_6

TWO-PHASE CONTROL SYSTEM

BACKGROUND OF THE INVENTION

1. Field of the Invention

The present invention relates to power control systems, and more particularly to a two-phase control system for sequential switching of a.c. power.

2. Description of the Prior Art

In aerospace applications it is desirable to convert medium voltage signals to high voltage signals upon command to activate various pyrotechnic events in a predetermined sequence. As shown in FIG. 1 prior art techniques used separate transformers T1', T2', T3' between the input, output, and each switching function SW1', SW2'. The switching function was performed between the center-tapped secondary of one transformer and the center-tapped primary of the next transformer, and at an intermediate voltage by relays, high voltage transistors or the like, which components are less reliable in the severe aerospace environments encountered than low voltage d.c. switching devices.

Therefore, it is an object of the present invention to provide for sequential switching of a.c. power at low voltages.

SUMMARY OF THE INVENTION

Accordingly, the present invention provides a two-phase control system for sequential switching of a.c. power. The a.c. power input is split into two phases at a low voltage. Each phase is sequentially switched simultaneously by d.c. switches. After the final switching function the two phases are recombined and output to provide a high voltage a.c. power output.

BRIEF DESCRIPTION OF THE DRAWINGS

FIG. 1 is a block diagram of a prior art a.c. sequential switching control system.

FIG. 2 is a block diagram of the two-phase control system of the present invention.

FIG. 3 is a schematic diagram of one embodiment of the two-phase control system.

FIG. 4 is a schematic diagram of a typical circuit controlled by the two-phase control system.

FIG. 5 is a schematic diagram of a typical d.c. switching function for the two-phase control system.

FIG. 6 is a timing diagram for the two-phase control system.

DESCRIPTION OF THE PREFERRED EMBODIMENT

Referring now to FIG. 2 a.c. voltage, typically on the order of 100-200 volts at 3-6 amps, is input to the primary of transformer T1. The secondary of transformer T1 has a grounded center tap and diodes D1, D2 to provide two phases $\phi_1$, $\phi_2$ 180° out of phase with each other. Switching functions SW1, SW2, SW3 in each phase path operate in response to d.c. control signals to either enable or block each phase path by closing or opening the paths for both phases simultaneously. After all the switching functions have been applied closing the switching functions, transformer T2 with a grounded primary center tap recombines the two phases $\phi_1$, $\phi_2$ to produce an a.c. voltage output at the secondary. Since each phase $\phi_1$, $\phi_2$ is merely a unipolar signal referenced to ground and shifted 180° from the other (see FIG. 6), the switching functions SW1, SW2, SW3 may be d.c. switches implemented by solid state devices operating at a low voltage, typically 30 volts peak for each phase. The a.c. voltage output is typically on the order of greater than 1,000 volts to provide the high power impulse required by pyrotechnic ignition circuits.

A typical application of a two-phase control system is illustrated in FIG. 3. A battery B, such as a missile flight battery, provides power to an inverter/converter 10. The inverter/converter 10 converts the power from the battery B into necessary system d.c. voltages and an a.c. voltage, typically 100-200 volts at 400 Hz. A transformer T, having a center tapped secondary connected to the return line 12, together with diodes D splits the inverter a.c. output voltage into two phases $\phi_1$, $\phi_2$ with peak values of typically 30 volts. The two phases $\phi_1$, $\phi_2$ are applied to the collectors of transistors $Q_{11}$, $Q_{21}$, respectively. Application of a control signal DC1 to the base of transistors $Q_{11}$, $Q_{21}$ simultaneously allows the two phases to appear as an output at the respective emitters. The output of transistors $Q_{11}$, $Q_{21}$ is then applied as an input to an output circuit FU1. A d.c. voltage on line 14 from the inverter/converter 10 can likewise be switched by the control signal DC1 through transistor $Q_{10}$ to provide a d.c. voltage to the output circuit FU1. The two phases $\phi_1$, $\phi_2$ are also applied to the collectors of transistors $Q_{12}$, $Q_{22}$ in parallel with transistors $Q_{11}$, $Q_{12}$. When a second control signal DC2 is applied to the bases of transistors $Q_{12}$, $Q_{22}$, the transistors conduct and provide the two phases $\phi_1$, $\phi_2$ as an output to a second output circuit FU2 and to transistors $Q_{13}$, $Q_{23}$ in series with transistors $Q_{12}$, $Q_{22}$. The d.c. voltage for the second output circuit FU2 may be switched on by a third control signal DC3 applied to transistor $Q_{20}$. Likewise a fourth control signal DC4 applied to transistors $Q_{30}$, $Q_{13}$, $Q_{23}$ switches the two phases $\phi_1$, $\phi_2$ and the d.c. voltage to a third output circuit FU3 as well as passing these signals on to the next switches in sequence. The final switching stage would switch the two phases $\phi_1$, $\phi_2$ and the d.c. voltage to the final output circuit $FU\eta$. The d.c. voltage signal line 14 could be eliminated for those output circuits which do not need a d.c. voltage signal.

Using integrated circuits and micro-electronics technology redundancy can be readily achieved by providing more than one series diode D in each phase path to protect against a short circuit failure of one diode, and by providing parallel redundant transistors for each switching function to protect against an open circuit failure of one transistor.

One type of output circuit is shown in FIG. 4. The two phases $\phi_1$, $\phi_2$ are applied to each side of the center tapped primary of an output transformer $T_o$. The d.c. voltage signal is applied to the base of a transistor $Q_o$ situated between the center tap of the primary of transformer $T_o$ and the return line so that the d.c. voltage signal enables the return line for the transformer $T_o$. A full wave bridge rectifier CR is connected across the secondary of transformer $T_o$ to provide a high voltage d.c. output to a storage capacitor C. The storage capacitor C provides the high voltage energy necessary to detonate a pyrotechnic device, for example.

A control circuit for transistor $Q_{11}$ is shown in FIG. 5. A voltage source $V_{dc}$ having a value greater than the peak value of phase $\phi_1$, such as 40 volts as opposed to 30 volts for phase $\phi_1$, is applied to the emitter of transistor $Q_A$. The collector of transistor $Q_A$ is connected to the base of transistor $Q_{11}$. The control signal (DC1) is applied to the base of transistor $Q_B$ which is in a common emitter configuration with the collector connected to the base of transistor $Q_A$. Transistors $Q_A$ and $Q_B$ are of opposite type, $Q_A$ being PNP and $Q_B$ being NPN. A relatively small value control signal (DC1) switches on transistor $Q_B$ which in turn switches on transistor $Q_A$ to apply $V_{dc}$ to the base of transistor $Q_{11}$, thus switching on transistor $Q_{11}$.

Transformers used in the two-phase control system are square loop transformers which reproduce any input a.c. wave shape such as that shown in FIG. 6 so long as the flux, $\phi$, does not exceed saturation, i.e., the flux density, B, remains within the hysteresis loop. This characteristic of the square loop transformer places a lower frequency limit on the a.c. waveform which can be faithfully reproduced, i.e., the saturation time must be greater than one-half the a.c. period. Such transformers are readily available.

Thus, the present invention eliminates the multiple transformers of the prior art by switching each phase of the a.c. power signal separately and recombining the two phases only after all control switching has been completed.

What is claimed is:

1. A two-phase control system for the sequential switching of an a.c. power signal comprising:
    (a) means for splitting said a.c. power signal into two phases separated by 180°;
    (b) means for sequentially switching said two phases simultaneously in response to a plurality of control signals to enable said two phases; and
    (c) means for recombining said two phases to reproduce said a.c. power signal at a specified voltage level as an output after all said control signals are applied.

2. A two-phase control system as recited in claim 1 further comprising means for amplifying each of said control signals prior to said control signals being applied to said simultaneous switching means.

3. A two-phase control system for the sequential switching of an a.c. power signal comprising:
    (a) means for splitting said a.c. power signal into two phases separated by 180°;
    (b) means for sequentially switching said two phases simultaneously in response to a plurality of control signals;
    (c) means for recombining said two phases to reproduce said a.c. power signal at a specified output voltage level; and
    (d) means for amplifying each of said control signals prior to said control signals being applied to said sequentially switching means, said amplifying means having:
        (i) a first solid state switch to which one of said control signals is applied; and
        (ii) a second solid state switch connected to a d.c. voltage having a value greater than the maximum value of said two phases, said second solid state switch being connected to said first solid state switch and said sequentially switching means so that when said control signal is applied to said first solid state switch said first solid state switch turns "on" said second solid state switch to apply said d.c. voltage to said sequentially switching means to simultaneously sequentially switch said two phases.

4. A two-phase control system as recited in claim 3 wherein said sequentially switching means comprises a plurality of solid state switching devices for each of said two phases, each of said solid state switching devices for one phase corresponding to one of said solid state switching devices for the other phase so that one of said control signals via said amplifying means switches a corresponding pair of said solid state switching devices to provide simultaneous switching of said two phases.

5. A two-phase control system as recited in claim 4 wherein each of said solid state switching devices comprises a low power transistor having one of said phases connected to the collector and having said one control signal via said amplifying means connected to the base so that when said one control signal is applied said one phase appears as an output at the emitter.

6. A two-phase control system comprising:
    (a) means for converting a d.c. potential source into an a.c. power signal;
    (b) means for splitting said a.c. power signal into two phases separated by 180°, each of said two phases having a peak voltage less than that of said a.c. power signal;
    (c) means for simultaneously switching each of said two phases sequentially in response to a plurality of control signals to enable said two phases; and
    (d) means for recombining said two phases to reproduce said a.c. power signal as an output after all said control signals are applied, said reproduced a.c. power signal having a peak voltage greater than said a.c. power signal.

7. A two-phase control system as recited in claim 6 further comprising means for amplifying each of said control signals prior to said control signals being applied to said simultaneous switching means.

8. A two-phase control system comprising:
    (a) means for converting a d.c. potential source into an a.c. power signal;
    (b) means for splitting said a.c. power signal into two phases separated by 180°, each of said two phases having a peak voltage less than that of said a.c. power signal;
    (c) means for simultaneously switching each of said two phases sequentially in response to a plurality of control signals;
    (d) means for recombining said two phases to reproduce said a.c. power signal, said reproduced a.c. power signal having a peak voltage greater than said a.c. power signal; and
    (e) means for amplifying each of said control signals prior to said control signals being applied to said simultaneously switching means, said amplifying means having:
        (i) a first solid state switch to which one of said control signals is applied; and
        (ii) a second solid state switch connected to a d.c. voltage having a value greater than the maximum value of said two phases, said second solid state switch being connected to said first solid state switch and said simultaneously switching means so that when said control signal is applied to said first solid state switch said first solid state switch turns "on" said second solid state switch to apply said d.c. voltage to said simultaneously switching means to simultaneously sequentially switch said two phases.

9. A two-phase control system as recited in claim 8 wherein said simultaneously switching means comprises a plurality of solid state switching devices for each of said two phases, each of said solid state switching devices for one phase corresponding to one of said solid state switching devices for the other phase so that one of said control signals via said amplifying means switches a corresponding pair of said solid state switching devices to provide simultaneous switching of said two phases.

10. A two-phase control system as recited in claim 9 wherein each of said solid state switching devices comprise a low power transistor having one of said phases connected to the collector and said one control signal via said amplifying means connected to the base so that when said one control signal is applied said one phase appears as an output at the emitter.

11. A two-phase control system for the sequential switching of an a.c. power signal comprising:
 (a) means for splitting said a.c. power signal into two phases separated by 180°;
 (b) a plurality of solid state switching devices for each of said two phases for sequentially switching said two phases simultaneously in response to a plurality of control signals;
 (c) means for recombining said two phases to reproduce said a.c. power signal at a specified output voltage level;
 (d) a first solid state switch to which one of said control signals is applied; and
 (e) a second solid state switch connected to a d.c. voltage having a value greater than the maximum value of said two phases, said second solid state switch being connected to said first solid state switch to amplify said control signal, and being connected to one or more of said solid state switching devices so that when said control signal is applied to said first solid state switch said first solid state switch turns "on" said second solid state switch to apply said d.c. voltage to said one or more solid state switching devices to turn "on" said one or more solid state switching devices.

12. A two-phase control system as recited in claim 11 wherein said splitting means comprises:
 (a) an input square loop transformer having a center tapped secondary connected to a return line, said a.c. power signal being applied to the primary; and
 (b) a diode connected to each terminal of the secondary of said square loop transformer to provide said two phases.

13. A two-phase control system as recited in claim 12 wherein said recombining means comprises an output square loop transformer having a center tapped primary connected to said return line, said two phases connected one to each terminal of said center tapped primary so that said a.c. power signal is reproduced at the secondary at said specified output voltage level.

14. A two-phase control system comprising:
 (a) means for converting a d.c. potential source into an a.c. power signal;
 (b) means for splitting said a.c. power signal into two phases separated by 180°, each of said two phases having a peak voltage less than that of said a.c. power signal;
 (c) a plurality of solid state switching devices for each of said two phases for simultaneously switching each of said two phases sequentially in response to a plurality of control signals;
 (d) means for recombining said two phases to reproduce said a.c. power signal, said reproduced a.c. power signal having a peak voltage greater than said a.c. power signal;
 (e) a first solid state switch to which one of said control signals is applied; and
 (f) a second solid state switch connected to a d.c. voltage having a value greater than the maximum value of said two phases, said second solid state switch being connected to said first solid state switch to amplify said one control signal, and being connected to one or more of said solid state switching devices so that when said control signal is applied to said first solid state switch said first solid state switch turns "on" said second solid state switch to apply said d.c. voltage to said one or more solid state switching devices to turn "on" said one or more solid state switching devices.

15. A two-phase control system as recited in claim 14 wherein said splitting means comprises:
 (a) an input square loop transformer having a center tapped secondary connected to a return line, said a.c. power signal being applied to the primary; and
 (b) a diode connected to each terminal of the secondary of said square loop transformer to provide said two phases.

16. A two-phase control system as recited in claim 15 wherein said recombining means comprises an output square loop transformer having a center tapped primary connected to said return line, said two phases connected one to each terminal of said center tapped primary so that said a.c. power signal is reproduced at the secondary at said specified output voltage level.

* * * * *